United States Patent [19]

Fors et al.

[11] 4,034,614

[45] July 12, 1977

[54] APPARATUS FOR GENERATING VIBRATIONS

[75] Inventors: Torsten Fors, Spanga; Martin Norrman, Sollentuna, both of Sweden

[73] Assignee: Dynapac Maskin AB, Solna, Sweden

[21] Appl. No.: 613,936

[22] Filed: Sept. 16, 1975

[51] Int. Cl.² .......... F16H 33/00

[52] U.S. Cl. .......... 74/61

[58] Field of Search .......... 74/61

[56] References Cited

U.S. PATENT DOCUMENTS

| | | | |
|---|---|---|---|
| 1,324,125 | 12/1919 | McKelvey | 74/61 |
| 3,600,956 | 8/1971 | Boguth | 74/61 |
| 3,813,950 | 6/1974 | Ebersole | 74/61 |

*Primary Examiner*—Samuel Scott
*Assistant Examiner*—Wesley S. Ratliff, Jr.
*Attorney, Agent, or Firm*—Brumbaugh, Graves, Donohue & Raymond

[57] ABSTRACT

An apparatus for generating vibrations comprises at least two masses mounted on a rotatable shaft and capable of moving radially against a spring force in relation to the center line of the shaft. Means for locking the masses to each other are provided, and the masses are arranged such that their respective centers of gravity are so distributed about the center line of the rotatable shaft that the resulting eccentric moment of the masses in relation to the center line is low or substantially zero when the shaft is stationary or rotating at low speed.

15 Claims, 6 Drawing Figures

10
11
12
13
14
15
16
17
18
19
19a
20
21
22
23
24
24a
25
26
27
28
29
30
II

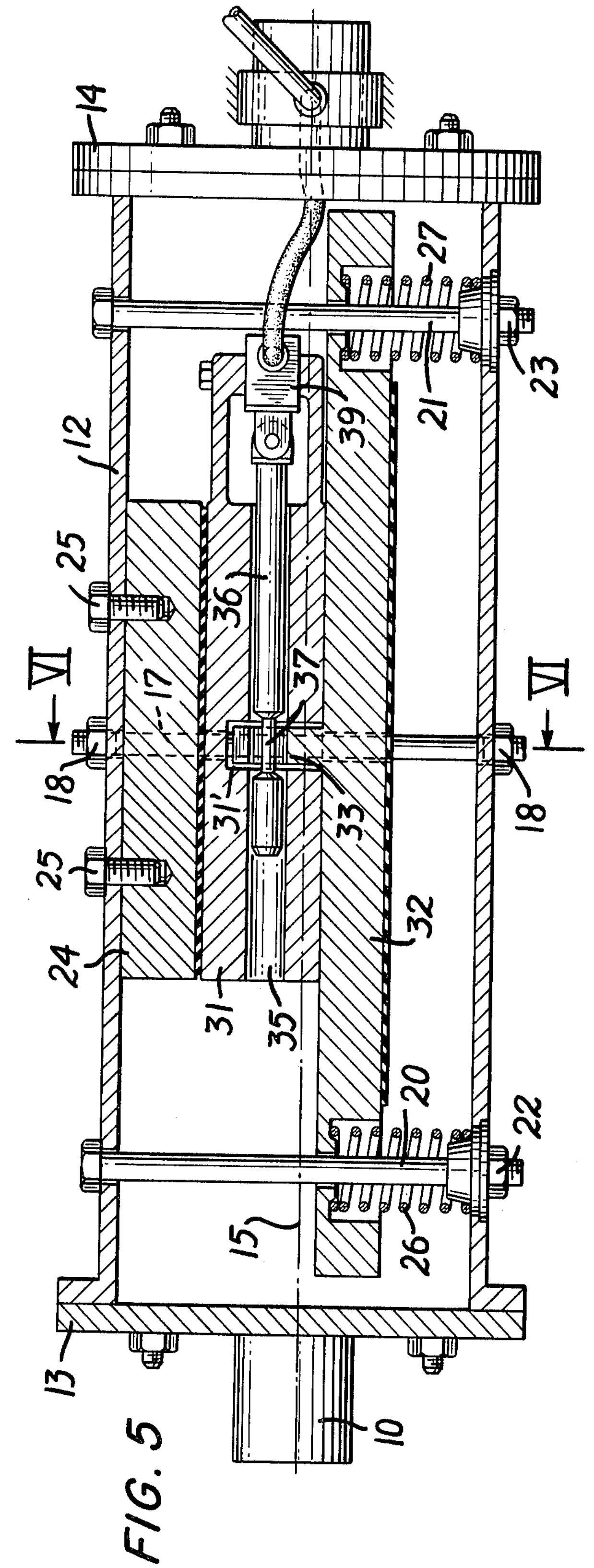
FIG. 5
FIG. 6
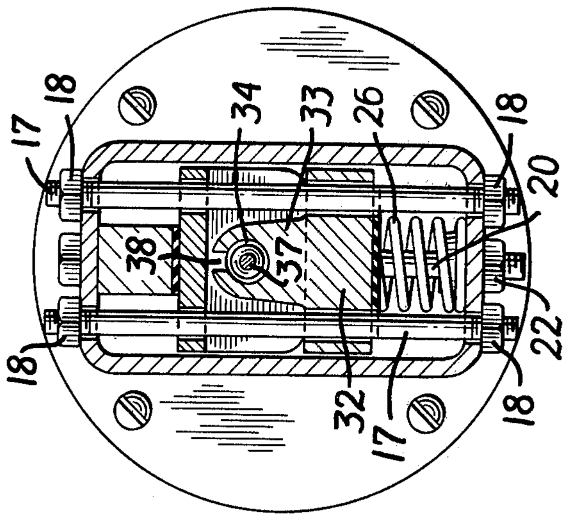

APPARATUS FOR GENERATING VIBRATIONS

BACKGROUND OF THE INVENTION

Vibrating rollers are generally used for the compaction of construction and surfacing materials for roads, airfields, car parks, etc. In practice, obtaining the best compaction results for different types of surfaces requires the application of different vibrational characteristics, such as low frequency, large amplitude vibrations for compacting soil, and high frequency, small amplitude vibrations for asphalt. A vibrating roller is therefore more efficiently utilized when it is capable of varying vibrational characteristics.

The vibrational characteristics of a roller may be varied by means of adjustable eccentric elements. In one known device, a volume of liquid held in a cavity positioned eccentrically on a rotating shaft acts as an eccentric weight. The cavity is connected to a hydraulic cylinder which supplies or removes liquid under pressure into or from the cavity. Adjusting the amplitude of the eccentric moment, i.e. the deviation of the moment of inertia of the eccentrically placed element with respect to the rotational axis, is thus accomplished hydraulically, independently of the direction of rotation or the rotational frequency.

However, this known device is disadvantaged by its relatively complicated construction and also requires a special drive system to operate the hydraulic cylinder. In addition, moving fluid under pressure from the cylinder into the eccentrically situated cavity takes time, and therefore a change of amplitude cannot be accomplished quickly. Further, the problem of leakage in hydraulic systems of this type results in further complications and less accuracy in setting the required amplitude.

Another known device utilizes spring-loaded eccentric weights on a rotating shaft which at different rotational speeds assume different angular positions in relation to each other and thereby give rise to a change in the resulting vibrational amplitude. The disadvantage with this device, however, is that, from a configuration producing high frequency and low amplitude, the device cannot be stopped without passing through a configuration of high amplitude, if it is desired to change the direction of shaft rotation, for example.

SUMMARY OF THE INVENTION

A principal object of invention is to provide an apparatus for generating vibrations which has varying vibrational characteristics suitable for the compaction of different types of materials and which overcomes the disadvantages of known vibrating devices. Thus, the invention is directed to the arrangement of eccentric elements on a rotatable shaft which is uncomplicated and which can be quickly changed to vary the frequency and amplitude of vibration, independently of the direction of shaft rotation or of rotational speed, without having to pass a configuration producing high amplitude vibrations when reducing the rotational speed of the device from a configuration producing low amplitude and high frequency vibrations.

According to the present invention, an apparatus for generating vibrations comprises at least two masses mounted on a rotatable shaft and capable of moving radially against a spring force in relation to the center line of the shaft. Means for locking the masses together are provided, and the masses are arranged such that their respective centers of gravity are so distributed about the center line of the rotatable shaft that the resulting eccentric moment of the masses in relation to the center line is low or substantially zero when the shaft is stationary or rotating at low speed. Characteristic of the invention is that the masses, when arranged as described above, have slightly different eccentric moments so that there is some resultant eccentric moment of the two masses in that arrangement.

In a preferred embodiment of the invention, one mass is movably mounted on a guide arranged at right angles to the center line of the shaft, and the other movable mass is mounted on the guide on an opposite side of the center line from the first movable mass. A fixed mass is secured to the shaft on the same side of the shaft center line as the movable mass having the lesser eccentric moment and prevents that mass from outward radial movement but permits radial movement in the direction of the other movable mass having the greater eccentric moment. The fixed mass is selected in relation to the movable masses such that the total eccentric moment of all the masses at rest is substantially zero. A spring is arranged on the shaft to bias the movable mass having the greater eccentric moment in an eccentric position such that at low shaft speeds the total eccentric position such that at low shaft speeds the total eccentric moment of the three masses will remain low or substantially zero. At higher shaft speeds, the movable mass having the greater eccentric moment, or the two movable masses locked together, moves radially outward under centrifugal force against the force of the spring to create a total eccentric moment of higher amplitude. Locking the two movable masses together may be accomplished through various means, for example, by making one mass an electromagnet which attracts the other mass, or by providing a displaceable locking pin on one mass and a complementary lug on the other, the pin being actuated by hydraulic or other mechanical means.

BRIEF DESCRIPTION OF THE DRAWINGS

The important features and further advantages of the present invention are described in detail below, in conjunction with the drawings, of which:

FIG. 5 is a longitudinal cross-section through another embodiment of the present invention having mechanical locking means; and FIG. 6 is a cross-section through the apparatus of FIG. 5, taken along view line VI—VI, showing the configuration of the masses when the shaft is stationary or rotating at low speed.

DETAILED DESCRIPTION

Figures 1, 2, 3, 4:
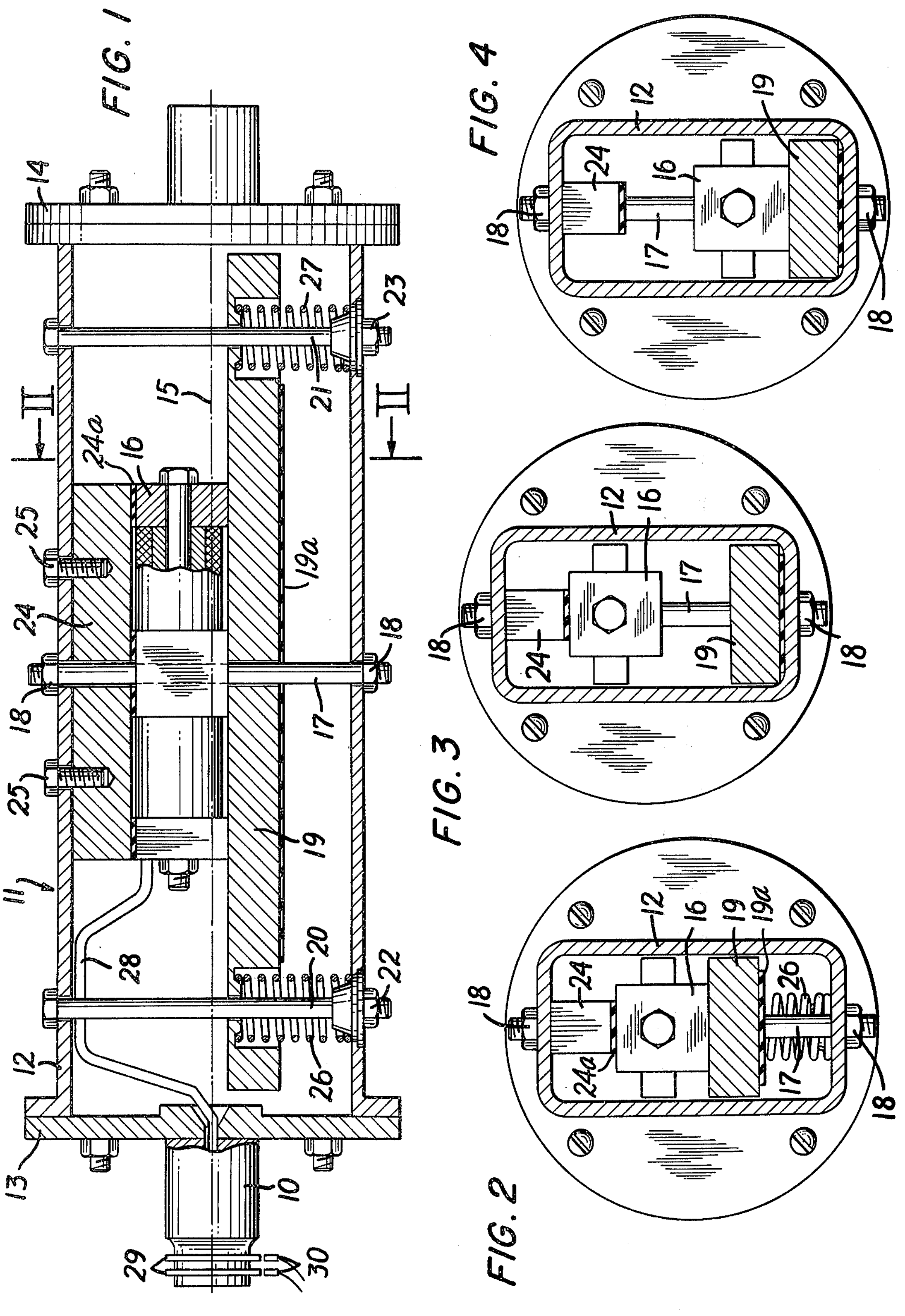
FIG. 1 is a longitudinal cross-section through an exemplary embodiment of the invention having electrical locking means.
FIG. 2 is a cross-section through the apparatus of FIG. 1, taken along view line II—II, showing the configuration of the masses when the shaft is stationery or rotating at low speed.
FIG. 3 is the cross-sectional view of FIG. 2, showing displacement of one of the masses when the shaft is rotated at a higher speed.
FIG. 4 is the cross-sectional view of FIG. 2, showing displacement of the two movable masses locked together when the shaft is rotated at a higher speed.

In FIG. 1, a shaft frame 11 is fixed to a rotatable shaft 10 and has a casing 12 with end plates 13, 14. Inside the casing, which is concentric in relation to the center line 15 of the shaft 10, is an electromagnet 16 constituting an eccentric mass capable of moving along a guide 17 arranged at right angles to the center line of the shaft. The guide 17 passes through an opposing two sides (see FIG. 2) of the casing 12 and is secured thereto by means of nuts 18. The electromagnet 16 is eccentrically positioned in relation to the center line of the shaft when the shaft is stationary or rotating at low speed. Electric current is supplied to the electromagnet through electrical leads 28 which are connected to an external electric power supply, not shown in the drawings, by means of slip rings 29 and contacts 30.

Another eccentric mass 19, arranged on the other side of the center line 15, has a greater eccentric moment than the electromagnet and is attracted to the electromagnet when it is energized. Like the electromagnet, the mass 19 is capable of moving radially in relation to the center line 15 of the rotatable shaft and is located in its movement by two studs 20 and 21 which are secured by nuts 22 and 23, respectively, to the casing 12. The guide 17 also helps to locate the eccentric mass 19. A plastic or rubber layer 19a on the bottom of the mass 19 insulates it from shock.

When the shaft 10 rotates, both the electromagnet 16 and the mass 19 are subjected to centrifugal forces which endeavour to move them radially but in opposite directions away from the center line 15 of the shaft 10. However, the electromagnet is prevented from so moving by a stop 24 which is rigidly attached by means of screws 25 to the casing 12 and which also acts as a fixed eccentric mass. A plastic or rubber insulating layer 24*a* provided on the fixed mass 24 diminishes magnetic attraction and provides mechanical damping between the fixed mass and the electromagnet.

The mass 19 is restrained from moving radially by two springs 26 and 27 arranged on the studs 20 and 21, respectively, but these springs have spring forces which are selected so that the centrifugal force acting on the mass 19 becomes stronger than the spring forces at a certain rotational speed of the shaft 10, whereupon the mass 19 is displaced radially outwards until it is stopped by the wall of the casing 12. The eccentric masses incorporated in the shaft frame 11 consequently consist of the one fixed mass and the two movable masses, and their distance from the center line 15 is chosen such that their total resulting eccentric moment will be low or substantially zero when the shaft 10 is stationary or rotating at low speed.

Utilizing the interplay between the eccentric masses described above, it is possible to select three different vibrational amplitude positions for the present apparatus:

a. the configuration shown in FIG. 2;
b. the configuration in which the mass 19 is displaced to the limit of its travel (FIG. 3); and
c. the configuration in which the mass 19, locked together with the electromagnet 16, is displaced to the limit of its travel (FIG. 4).

Configuration (a) is obtained when shaft 10 is stationary or rotating at low speed. As explained previously, this configuration preferably has substantially zero eccentricity, which is an advantage when starting rotation of the shaft. Configuration (b) is obtained when the electromagnet 16 is not energized and when the rotation of the shaft 10 exceeds the shaft speed at which the centrifugal force acting on the mass 19 overcomes the force of the springs 26, 27. This produces the vibrational characteristics of low amplitude and high frequency.

Configuration (c) results when the electromagnet 16 is energized and consequently attracts the mass 19. Since the eccentric moment of the mass 19 is greater than that of the electromagnet, the mass 19 pulls the magnet along with it under centrifugal force. When the rotational speed of the shaft 10 is such that the centrifugal force on the combined eccentric mass, i.e., the electromagnet 16 and the eccentric mass 19, is greater than the force of the springs 26, 27, the composite mass is flung radially outwards against the wall of the casing 12 into the position shown in FIG. 4. Since the composite mass is greater than the eccentric mass 19, the composite mass is flung outwards under centrifugal force at a lower rotational speed of the shaft in comparison to the eccentric mass 19 alone. Configuration (c) therefore results in vibrations of higher amplitude at a lower frequency than in the configuration (b).

Insofar as the configuration producing high amplitude vibrations requires that the electromagnet be locked with the mass 19, the rotational shaft speed can be reduced from the low amplitude, high frequency configuration (b) without having to pass through the configuration (c) producing high vibrational amplitude. This feature of the present apparatus thus overcomes a disadvantageous characteristic of some known vibrating devices. The apparatus described above can be used with any type of vibrating machine, but its most important application is in vibrating rollers for compacting soil and asphalt.

Another embodiment of the present invention is shown in FIGS. 5 and 6. Instead of using an electromagnet, locking the two movable masses to each other is accomplished by means of a locking pin on one mass being dispaceable into a hole of a lug on the other mass. In FIG. 5, the shaft 10, shaft frame 11, casing 12, guide 17, studs 20, 21, stop 24, and springs 26, 27 are arranged as before. The two movable eccentric masses 31 and 32 correspond respectively to the electromagnet 16 and the mass 19 in FIG. 1, and the relationship between the eccentric moments of the fixed and the movable masses is the same.

One eccentric mass 32 is fltted with a lug 33 which enters an opening 31′ provided in the other mass 31 when the two masses are in contact with each other. The lug 33 is provided with a hole 34 (FIG. 6) which is disposed concentrically in relation to a bore 35 (FIG. 5) in the mass 31 when the lug 33 is positioned in the opening 31′. The axis lining up the hole 34 with the bore 35 is at right angles to the direction of movement of the masses.

To lock the masses 31 and 32 to each other, a displaceable pin 36 in the bore 35 of the mass 31 passes through the hole 34 in the lug 33. In order to reduce the movement of the locking pin 36 from an unlocked to a locked position and at the same time locate the pin on either side of the lug 33, the diameter of the locking pin 36, along a portion 37 of its axial length corresponding to the thickness of the lug, is narrowed to a dimension corresponding to a slot 38 in the top of the lug 33. Thus, when the narrowed portion 37 is in the position shown in FIG. 5, the masses 31 and 32 are separable from each other. Engagement and disengagement of the locking pin with the lug may be accomplished hydraulically, for example, with the aid of a ram 39 acting on the locking pin. Hydraulic oil for the ram may suitably be supplied via a flexible hose connected to a passageway drilled in the center of the shaft 10 through rotatable hose couplings in the end of the shaft from a hydraulic source. The locking pin can also be mechanically actuated with a flexible cable introduced into the shaft frame through a rotatable coupling.

It will be understood that the above described embodiments are merely exemplary and that persons skilled in the art may make variations and modifications without departing from the spirit and scope of the invention. All such modifications and variations are intended to be within the scope of the invention as defined in the appended claims.

We claim:

1. Apparatus for generating vibrations comprising a rotatable shaft and at least two masses, means for mounting one mass on the shaft in a first eccentric position with respect to the center line of the shaft, means including a spring for mounting at least one other mass on the shaft in a second eccentric position with respect to the center line of the shaft, the other mass mounting means permitting outward radial movement of the other mass against the spring, and means for selectively locking the masses to each other, the first and second eccentric positions being selected so that the resultant eccentric moment of the masses in relation to the center line of the shaft is low or substantially zero when the shaft is stationary or rotating at low speed.

2. The apparatus as defined in claim 1, wherein when the masses are unlocked, the one mass remains in its first position and the other mass moves radially from its second position against the spring in response to shaft rotation above a selected speed to provide vibrations.

3. The apparatus as defined in claim 1, wherein the selective locking means includes an electromagnet and armature selectively energized to lock the masses together.

4. The apparatus as defined in claim 1, wherein the selective locking means includes hydraulic displacing means cooperating with the masses for locking them together.

5. Apparatus for generating vibrations comprising a rotatable shaft and at least two masses, means for mounting one mass on the shaft in a first eccentric position with respect to the center line of the shaft and permitting radial movement of the mass, means including a spring for mounting at least one other mass on the shaft in a second eccentric position with respect to the center line of the shaft and permitting outward radial movement of the mass against the spring, and means for selectively locking the masses to each other, the first and second eccentric positions being selected so that the resultant eccentric moment of the masses in relation to the center line of the shaft is low or substantially zero when the shaft is stationary or rotating at low speed.

6. The apparatus as defined in claim 5, wherein when the masses are locked the masses move radially from their first and second positions against the spring in response to shaft rotation above a selected speed to provide vibrations.

7. The apparatus as defined in claim 5, wherein the selective locking means includes an electromagnet and armature selectively energized to lock the masses together.

8. The apparatus as defined in claim 5, wherein the selective locking means includes hydraulic displacing means cooperating with the masses for locking them together.

9. Apparatus for generating vibrations comprising a rotatable shaft and at least two masses, means for mounting one mass on the shaft in a first eccentric position with respect to the center line of the shaft and permitting radial movement of the mass, means including a spring for mounting at least one other mass on the shaft in a second eccentric position with respect to the center line of the shaft and permitting outward radial movement of the mass against the spring, and means for selectively locking the masses to each other, the first and second eccentric positions being selected so that the resultant eccentric moment of the masses in relation to the center line of the shaft is low or substantially zero when the shaft is stationary or rotating at low speed, the first mass remaining in its first position and the second mass moving radially against the spring in response to shaft rotation above a first selected speed when the masses are unlocked to provide one amplitude of vibration, the first and second masses moving radially against the spring upon rotation of the shaft above a second selected speed when the masses are locked to provide another amplitude of vibration.

10. The apparatus as defined in claim 9, wherein the selective locking means includes an electromagnet and armature selectively energized to lock the masses together.

11. The apparatus as defined in claim 9, wherein the selective locking means includes hydraulic displacing means cooperating with the masses for locking them together.

12. Apparatus for generating vibrations comprising a rotatable shaft and three masses, means for mounting the first mass on the shaft in a first eccentric position with respect to the center line of the shaft and permitting radial movement of the mass, means including a spring for mounting the second mass on the shaft in a second eccentric position with respect to the center line of the shaft and permitting outward radial movement of the mass against the spring, means for fixedly mounting the third mass in a third eccentric position with respect to the center line of the shaft, and means for selectively locking the first and second masses together, the first, second and third eccentric position being selected so that the resultant eccentric moment of the masses in relation to the center line of the shaft is low or substantially zero when the shaft is stationary or rotating at low speed, the first mass remaining in its first position and the second mass moving radially against the spring in response to shaft rotation above a first selected speed when the masses are unlocked to provide one amplitude of vibration, the first and second masses moving radially against the spring upon rotation of the shaft above a second selected speed when the masses are locked to provide another amplitude of vibration.

13. The apparatus as defined in claim 12, wherein the selective locking means comprises one of the first and second masses being an electromagnet and the other of the masses being an armature for the electromagnet, and conductive means for selectively energizing the electromagnet to lock the first and second masses together.

14. The apparatus as defined in claim 12, wherein the selective locking means comprises a pin on the first mass and a lug on the second mass, and hydraulic means for moving the pin with respect to the lug to lock the first and second masses together.

15. Apparatus for generating vibrations comprising a rotatable shaft and at least two masses, means for mounting one mass on the shaft in a first eccentric position with respect to the center line of the shaft, means for mounting at least one other mass on the shaft in a second eccentric position with respect to the center line of the shaft and permitting outward radial movement of the mass, means on the shaft for biasing the other mass toward the second eccentric position, the other mass moving radially outward against the biasing means upon rotation of the shaft above a selected speed, and means for selectively locking the masses to each other, the first and second eccentric positions being selected so that the resultant eccentric moment of the masses in relation to the center line of the shaft is low or substantially zero when the shaft is stationary or rotating at low speed.

* * * * *